(12) United States Patent
Kaushik

(10) Patent No.: US 10,122,745 B2
(45) Date of Patent: Nov. 6, 2018

(54) HEURISTICS-BASED IDENTIFICATION OF IOT (INTERNET OF THINGS) ATTACKS IN WI-FI

(71) Applicant: Fortinet, Inc., Sunnyvale, CA (US)

(72) Inventor: Anil Kaushik, Bangalore (IN)

(73) Assignee: Fortinet, Inc., Sunnyvale, CA (US)

(*) Notice: Subject to any disclaimer, the term of this patent is extended or adjusted under 35 U.S.C. 154(b) by 0 days.

(21) Appl. No.: 15/396,632

(22) Filed: Dec. 31, 2016

(65) Prior Publication Data

US 2018/0191756 A1    Jul. 5, 2018

(51) Int. Cl.
*H04L 29/06* (2006.01)
*G06F 21/56* (2013.01)

(52) U.S. Cl.
CPC ........ *H04L 63/1425* (2013.01); *H04L 63/145* (2013.01); *G06F 21/56* (2013.01)

(58) Field of Classification Search
CPC .............. H04L 63/14–63/145; G06F 21/56
See application file for complete search history.

(56) References Cited

U.S. PATENT DOCUMENTS

| 2016/0261465 A1* | 9/2016 | Gupta ............... H04L 41/14 |
| 2017/0126704 A1* | 5/2017 | Nandha Premnath ............... H04L 63/145 |
| 2017/0230832 A1* | 8/2017 | Ophir ............... H04W 12/08 |

* cited by examiner

*Primary Examiner* — Matthew Smithers
*Assistant Examiner* — Shaqueal D Wade
(74) *Attorney, Agent, or Firm* — Law Office of Dorian Cartwright; Dorian Cartwright

(57) ABSTRACT

Attacks from IoT (Internet of Things) devices (or other statins) on a Wi-Fi network are identified using heuristics. Frames are detected from an IoT device (or conventional station) over a window of time. The frame is processed to expose IoT application data from the frame over the time window. Deviations are identified in the IoT application data to detect malicious activity from the IoT device by comparing the IoT application data from at least a first time and a second time within the time. Responsive to the IoT data comparison detecting a malicious activity from the IoT device, a network security action is performed in reference to the IoT device, the network security action to prevent the malicious activity.

7 Claims, 5 Drawing Sheets

FIG. 6 is a block diagram illustrating an example computing device, according to one embodiment.

HEURISTICS-BASED IDENTIFICATION OF IOT (INTERNET OF THINGS) ATTACKS IN WI-FI

FIELD OF THE INVENTION

The invention relates generally to computer networking, and more specifically, to identification of IoT attacks in Wi-Fi.

BACKGROUND

IoT (Internet of Things) devices such as sensors, smart appliances and even shoes are burdening networks along with conventional devices such as smart phones and tablet computing devices. For example, refrigerators, temperature sensors, and shoes can have network connectivity and send data from applications to associated servers, for example.

These stations can be BYOD (bring your own device) stations, such as a personal smartphone, that are not controlled by an entity or organization, as are the company computers and terminals which are known to and controlled by the network. As a result, it is more difficult to recognize an IoT device versus a rogue device on the network.

What is needed is a robust technique to identify IoT attacks from heuristic analysis of data being sent by IoT devices over a window of time.

SUMMARY

These shortcomings are addressed by the present disclosure of methods, computer program products, and systems for identifying IoT attacks with heuristics.

In one embodiment, frames are detected from an IoT device (or conventional station) over a window of time. The frame is processed to expose IoT application data from the frame over the time window. Deviations are identified in the IoT application data to detect malicious activity from the IoT device by comparing the IoT application data from at least a first time and a second time within the time.

In another embodiment, responsive to the IoT data comparison detecting a malicious activity from the IoT device, a network security action is performed in reference to the IoT device, the network security action to prevent the malicious activity.

Advantageously, IoT attacks can be identified from a network perspective without control over and configuration of associated IOT devices.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for identifying IoT attacks from heuristic data. One of ordinary skill in the art will recognize many additional variations made possible by the succinct description of techniques below.

I. Systems to Identify IoT Attacks (FIGS. 1-3)

Figure 1:
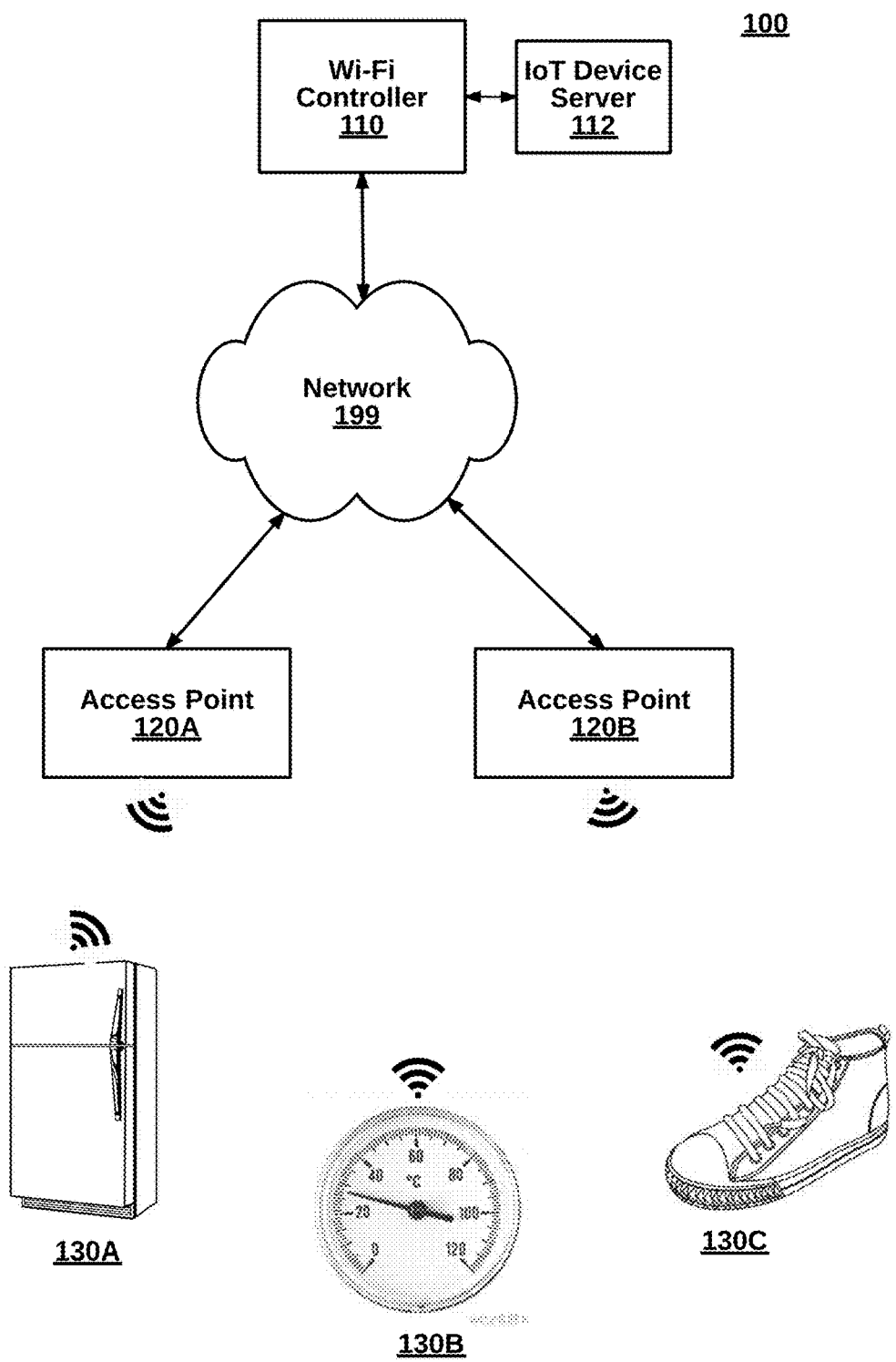
FIG. 1 is a high-level block diagram illustrating a system to identify IoT attacks with heuristics, according to one embodiment.
Figures 2, 3:
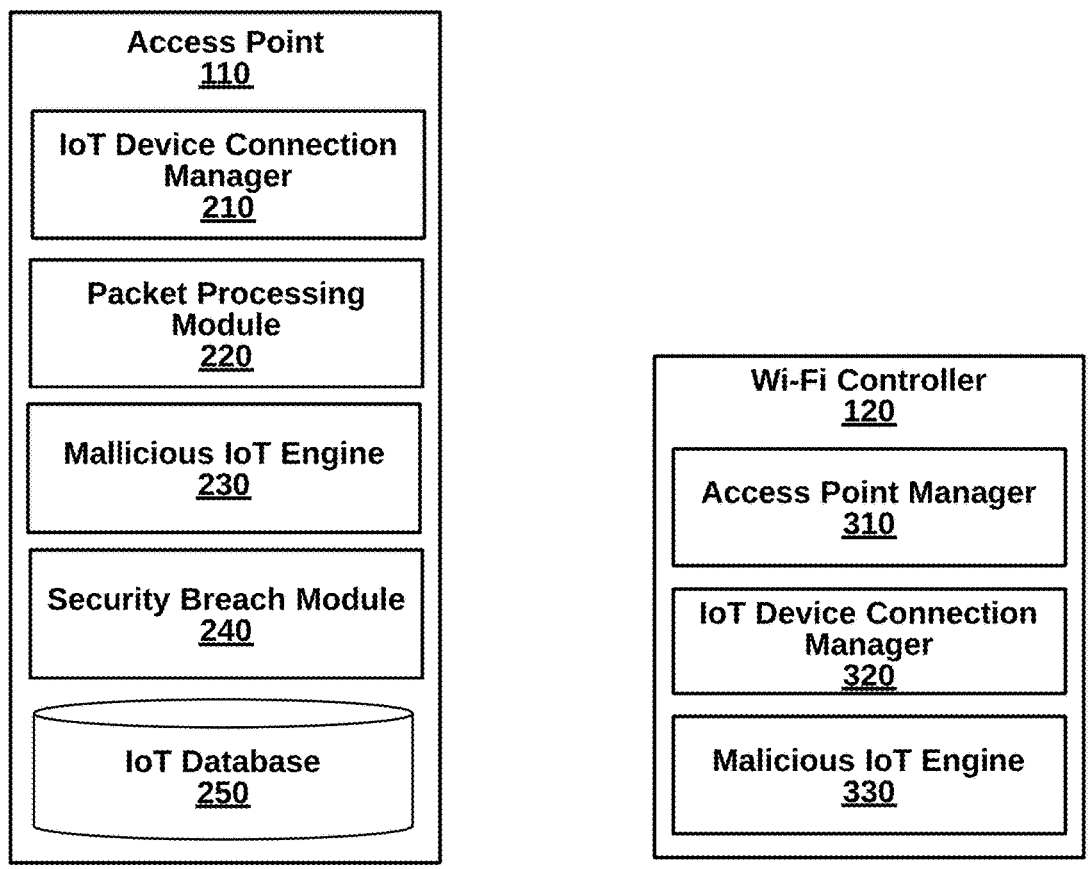
FIGS. 2-3 are more detailed block diagrams illustrating an access point and a Wi-Fi controller of the system of FIG. 1, respectively, according to some embodiments.

FIG. 1 is a high-level block diagram illustrating a system 100 to identify IoT attacks with heuristics, according to one embodiment. The system 100 comprises a Wi-Fi controller 110, access points 120A-B, and IoT devices 130A-C.

The access points 120A-B (generically referred to as 120), in an embodiment, analyzes data in frames of IoT application data to identify IoT attacks from deviancies. The data can be collected over a predetermined or dynamic window of time (e.g., 1 hour, 1 day, or until a condition is reached). Deviancies can be relative to data variation within a time window, or be relative to data variation from expected ranges. Examples of deviations can include a temperature sensor 130B with out of range data, such as 10 degree Fahrenheit temperature readings from an Arizona location in July. Furthermore, a shoe sensor 130C providing location readings in Arizona should not be doing the same from France just 5 minutes later. The IoT device server 112 can store expected values, IoT rules for a specific IoT device or for a device type, and other reference data. In another embodiment, IoT device server 112 collect data to generate or model expected patterns or trends, and use statistical analysis to identify deviations. Many other embodiments are possible.

In other operations, the access point manages connections of stations from a Wi-Fi channel by advertising through periodic beacons, and associating SSIDs with stations. Additional embodiments of the access point 110 are described below in association with FIG. 2.

The Wi-Fi controller 110 can also perform analyses, independent of, or in conjunction with, the access point 120. Because the Wi-Fi controller 110 has network-wide visibility, additional data and network interactions of stations are available. In some cases, network packets are passively forwarded to the Wi-Fi controller 110 for routing and analysis. In other cases, network packets processed by the access point 120 bypass the Wi-Fi controller 110, but summaries and relevant data or relevant packets are sent upstream from the access point 120.

Other tasks of the Wi-Fi controller 110 can include managing other aspects of access points and stations and their relationship, for example, managing BSSID assignments and hand-offs, implementing system-wide Wi-Fi policies, load balancing, managing a number of station connections at a particular access point, and the like. The Wi-Fi controller policies, as implemented, can override, co-exist, or compete with the access point policies concerning channel assignment. Additional embodiments of the Wi-Fi controller 110 are set forth in FIG. 3.

IoT devices 130A-C (generically referred to as 130) comprise physical devices or non-computerized devices that are present on the network through a network card, RF tag, or other mechanism, in some cases. Here, a refrigerator 10A, a temperature sensor 130B and a shoe 130C are all present. The presence can be direct with a communication device, or indirect when scanned and reported by a conventional network device. In other cases, the IoT device 130 refers to a computerized device that conventionally connects to the network, such as a smartphone or laptop computer.

Figure 6:
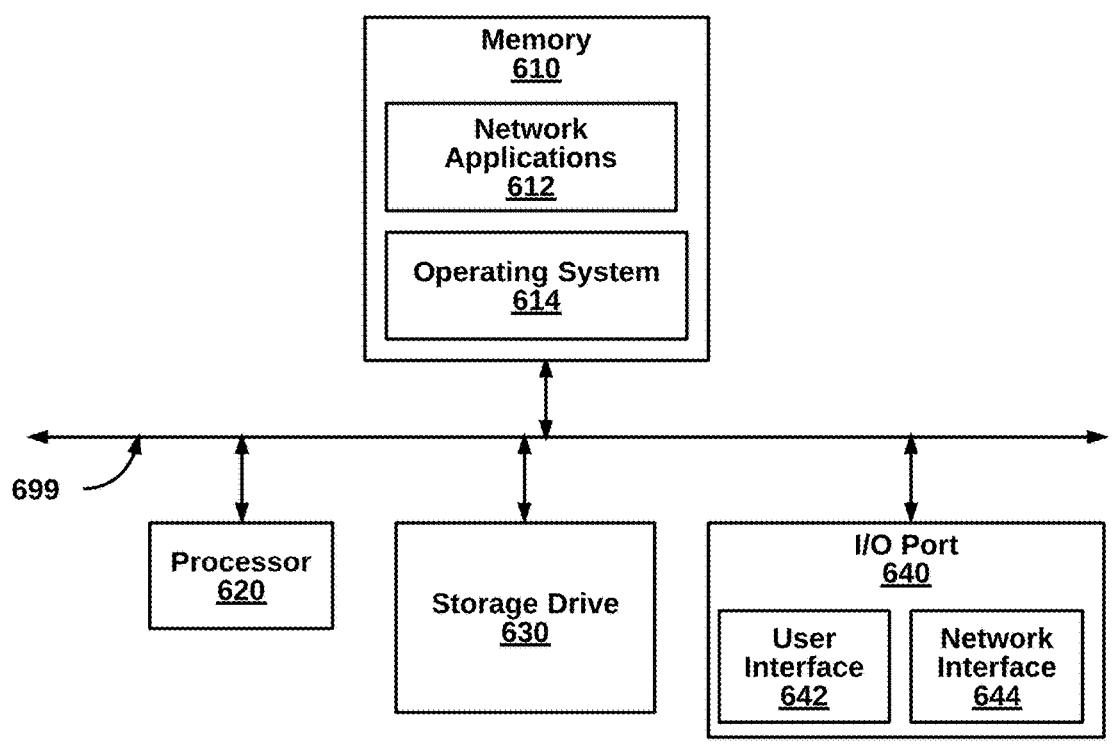
FIG. 6 is a block diagram illustrating an example computing device, according to one embodiment.

The network components of the system 100 can implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 6).

Network components can be directly or indirectly coupled to a network 199, such as a LAN (local access network, a WAN (wide area network), the Internet, a cellular network, through any suitable wired (e.g., Ethernet) or wireless (e.g., Wi-Fi or 4G) medium, or combination. The stations 130A-D are coupled by Wi-Fi connection to the access point 110 which in turn is connected to the network 199 (i.e., to network backbone components therein), preferably through a wired connection. The stations 130A,B are connected to high throughput channels while the stations 130C,D are connected to low throughput channels. Finally, the Wi-Fi controller 120 is also connected to the network 199, preferably through a wired connection. Many variations are possible. For example, there can be additional components such as firewalls, routers, and more switches and stations. Additionally, components can be implemented with a single physical box, or, each could represent a cluster of physical boxes acting in coordination. The system 100 can be implemented locally as a LAN or be implemented in the cloud with certain components being remotely available (e.g., through a firewall). Wi-Fi components can communicate using IEEE (Institute of Electrical and Electronics Engineers) 802.11 protocols, including IEEE 802.11n and IEEE 802.11ac.

FIG. 2 is a more detailed block diagram illustrating the access point 120 of the system 100, according to one embodiment. The access point 120 comprises an IoT device connection manager 210 to periodically advertise with beacons, manage BSSIDs (basic service set identifiers), and provide network access to stations. A packet processing module 220 parses data frames from IoT devices to reveal data along with header information. A malicious IoT engine 230 determines whether a deviation has occurred. A security breach module 240 can take a security action such a notification or access denial if the deviation amounts to a suspected security breach. An IoT database 250 can locally store IoT rules and other data similar to the IoT device server 112. The components can be implemented in hardware, software, or a combination of both.

FIG. 3 is a more detailed block diagram illustrating a representative Wi-Fi controller 110 that comprises an access point manager 310 to direct access points for station and BSSID assignments, services, performance, configurations, and the like. An IoT device connection manager 320 controls individual stations with specific policies. A malicious IoT engine 330 can assist in identifying malicious activity from data deviations during a time window form a network-side perspective. Malicious activity can be sent from inside or outside of a local access network. The components can be implemented in hardware, software, or a combination of both.

The access point manager 310 communicates with the access point 110 and other access points for Wi-Fi functionality such as beaconing, assigning BSSIDs, and handing-off stations between access points. The Ethernet controller 330 provides I/O ports for the network 199, and other directly connected devices.

II. Methods for Identifying IoT Attacks (FIGS. 4-5)

Figure 4:
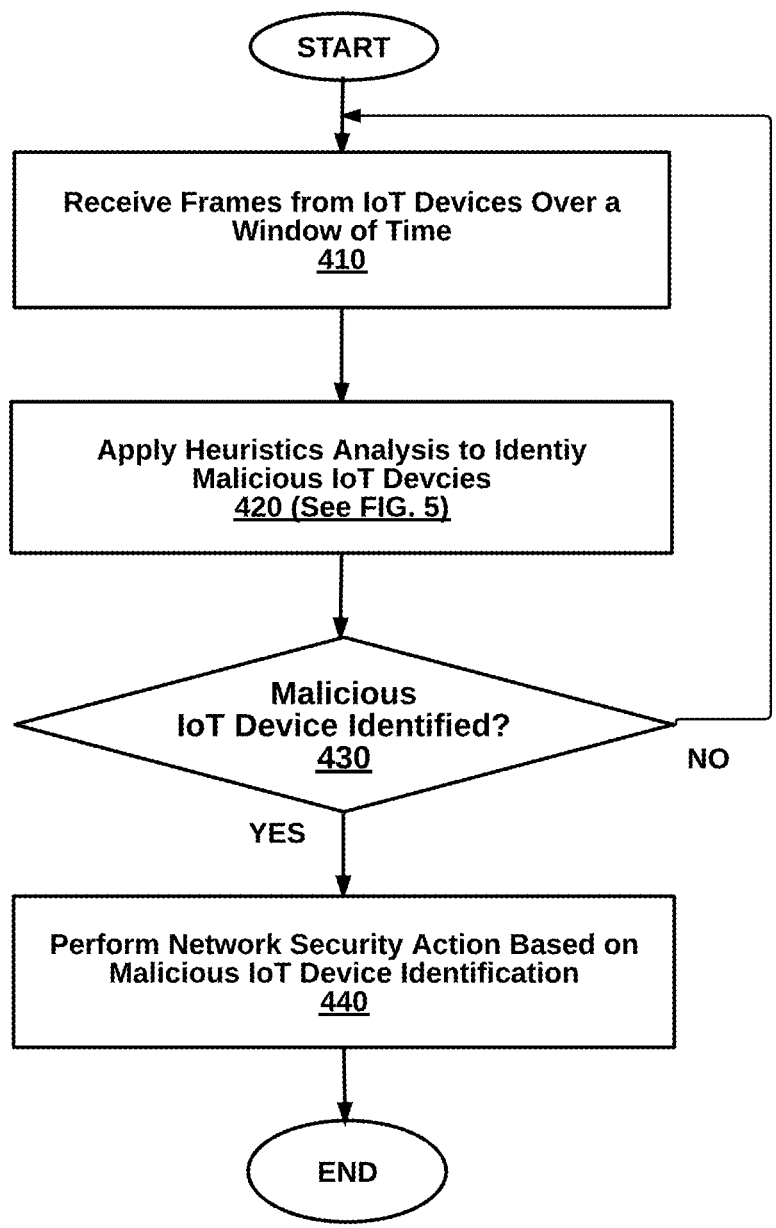
FIG. 4 is a high-level flow diagram illustrating a method for identifying IoT attacks with heuristics, according to one embodiment.

FIG. 4 is a high-level flow diagram illustrating a method 400 for identifying IoT attacks with heuristics, according to one embodiment. One of ordinary skill in the art will recognize that the method 400 is non-limiting as other embodiments can have more or less steps and can be performed in a different order.

At step 410, frames from IoT devices are received over a window of time. At step 420, heuristic analysis is applied to identify malicious IoT devices, as described by way of example below in association with FIG. 5. At step 430, if a malicious IoT device is identified, at step 440, a network security action is performed.

Figure 5:
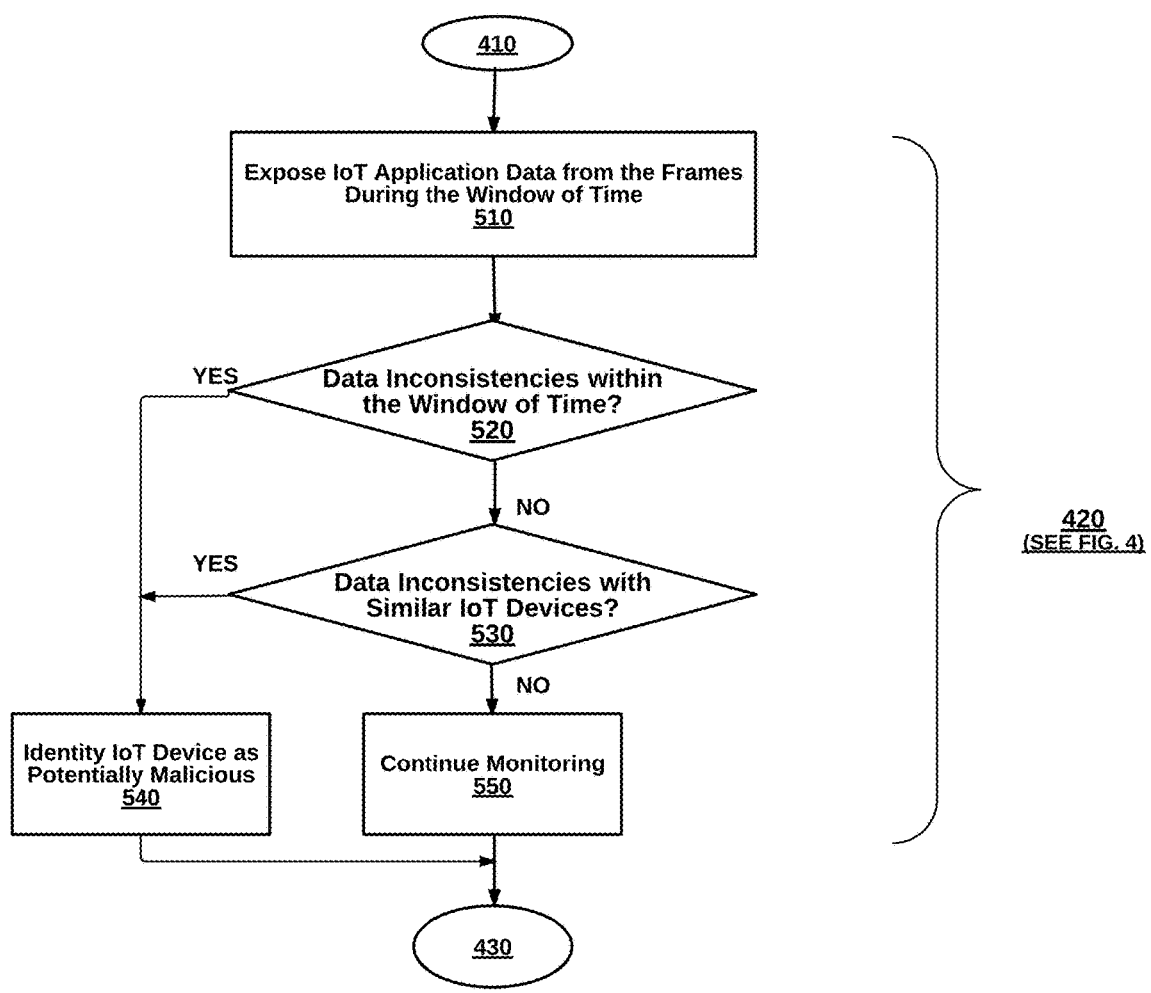
FIG. 5 are each more detailed flow diagram illustrating the step of determining throughput capabilities from the method of FIG. 4, according to one embodiment.

FIG. 5 are each more detailed flow diagram illustrating the step 420 of determining throughput capabilities from the method of FIG. 4, according to one embodiment.

At step 510, IoT application data is exposed from frames parsed during a window of time. At step 520, responsive to data inconsistencies between different times within the window of time, at step 540 an IoT device is identified as potentially malicious. Otherwise, at step 550, monitoring is continued.

III. Generic Computing Device (FIG. 6)

FIG. 6 is a block diagram illustrating an exemplary computing device 600 for use in the system 60 of FIG. 1, according to one embodiment. The computing device 600 is an exemplary device that is implementable for each of the components of the system 100. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog, and use any suitable protocol.

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method, in an access point of a data communication network, for heuristics-based identification of IoT (Internet of Things) attacks in wireless communication from data, the method comprising the steps of:
   transmitting beacons for setting-up a wireless communication connection with an IoT device utilizing a BSSID (Basic Service Set Identifier);
   wherein the IoT device comprises a non-computerized physical device that is retrofitted for a network presence;
   detecting wireless communication frames transmitted from the IoT device to the access point over a window of time;
   applying a heuristic analysis to identify whether the IoT device is malicious by:
   processing the wireless communication frames to expose IoT application data from the wireless communication frame over the time window in conjunction with a wireless communication controller having network-wide visibility of the IoT device interactions from at least one other access point;
   identifying deviations in the IoT application data to detect malicious activity from the IoT device by comparing the IoT application data from at least a first time and a second time within the time window at least partially based on the network-wide visibility of the IoT device interactions from the at least one other access point; and
   responsive to the IoT application data comparison detecting a malicious activity from the IoT device, performing a network security action in reference to the IoT device, the network security action to prevent the malicious activity.

2. The method of claim 1, further comprising:
   comparing the IoT application data to a range of expected IoT application data.

3. The method of claim 1, further comprises: receiving input from the wireless communication controller for the deviation identification.

4. The method of claim 1, wherein the IoT device is indirectly connected to a network with a passive RF tag.

5. The method of claim 1, wherein the IoT device comprises a conventional computer networking device.

6. The method of claim 1, wherein the malicious activity sent from the IoT device is being sent outside of a local access network.

7. A non-transitory computer-readable medium storing source code that, when executed by a processor, performs a method in an access point of a data communication network, for heuristics-based identification of IoT attacks in wireless communication from data, the method comprising the steps of:
   transmitting beacons for setting-up a wireless communication connection with an IoT device utilizing a BSSID (Basic Service Set Identifier);
   wherein the IoT device comprises a non-computerized physical device that is retrofitted for a network presence;
   detecting wireless communication frames transmitted from the IoT device to the access point over a window of time;
   applying a heuristic analysis to identify whether the IoT device is malicious by:
   processing the wireless communication frames to expose IoT application data from the wireless communication frame over the time window in conjunction with a wireless communication controller having network-wide visibility of the IoT device interactions from at least one other access point;

identifying deviations in the IoT application data to detect malicious activity from the IoT device by comparing the IoT application data from at least a first time and a second time within the time window at least partially based on the network-wide visibility of the IoT device interactions from the at least one other access point; and responsive to the IoT application data comparison detecting a malicious activity from the IoT device, performing a network security action in reference to the IoT device, the network security action to prevent the malicious activity.

\* \* \* \* \*